United States Patent [19]

Wray

[11] Patent Number: 4,469,566
[45] Date of Patent: Sep. 4, 1984

[54] METHOD AND APPARATUS FOR PRODUCING ELECTROPLATED MAGNETIC MEMORY DISK, AND THE LIKE

[75] Inventor: Daniel X. Wray, Canoga Park, Calif.

[73] Assignee: Dynamic Disk, Inc., Chatsworth, Calif.

[21] Appl. No.: 527,349

[22] Filed: Aug. 29, 1983

[51] Int. Cl.³ .............................................. C25D 5/00
[52] U.S. Cl. ................................. 204/23; 204/DIG. 7
[58] Field of Search ........ 204/23, 43 N, 212, DIG. 7, 204/43 T

[56] References Cited

U.S. PATENT DOCUMENTS

| | | | |
|---|---|---|---|
| 3,407,126 | 10/1968 | Koretzky | 204/43 N |
| 3,463,708 | 8/1969 | Grant | 204/43 P |
| 3,634,047 | 1/1972 | Faulkner | 204/23 |
| 3,637,471 | 1/1972 | Faulkner | 204/43 P |
| 3,788,897 | 1/1974 | Gerard | 204/29 |
| 3,950,234 | 4/1976 | Faulkner | 204/43 P |
| 4,144,160 | 3/1979 | Faulkner | 204/212 |
| 4,304,641 | 12/1981 | Grandia | 204/DIG. 7 |
| 4,359,375 | 11/1982 | Smith | 204/212 |

Primary Examiner—Thomas Tufariello
Attorney, Agent, or Firm—Keith D. Beecher

[57] ABSTRACT

A process and apparatus for producing magnetic memory disks, and the like, of the type in which a thin layer of fine grain nickel/phosphorous paramagnetic material is first deposited on a large grain electrically conductive substrate, and a main magnetic layer is then electroplated over the nickel/phosphorous paramagnetic layer. In the practice of the method of the invention, the paramagnetic layer is electroplated onto the substrate through one or more openings in one or more rotating masks to provide directly a smooth fine grain layer of uniform density and thickness so as to obviate any necessity for time consuming and expensive polishing and burnishing operations of the paramagnetic film prior to the electroplating thereon of the main magnetic film; and the magnetic layer is also electroplated onto the paramagnetic layer through openings in one or more masks to provide a magnetic layer of controlled thickness for uniform magnetic response over the entire surface of the disk.

11 Claims, 5 Drawing Figures

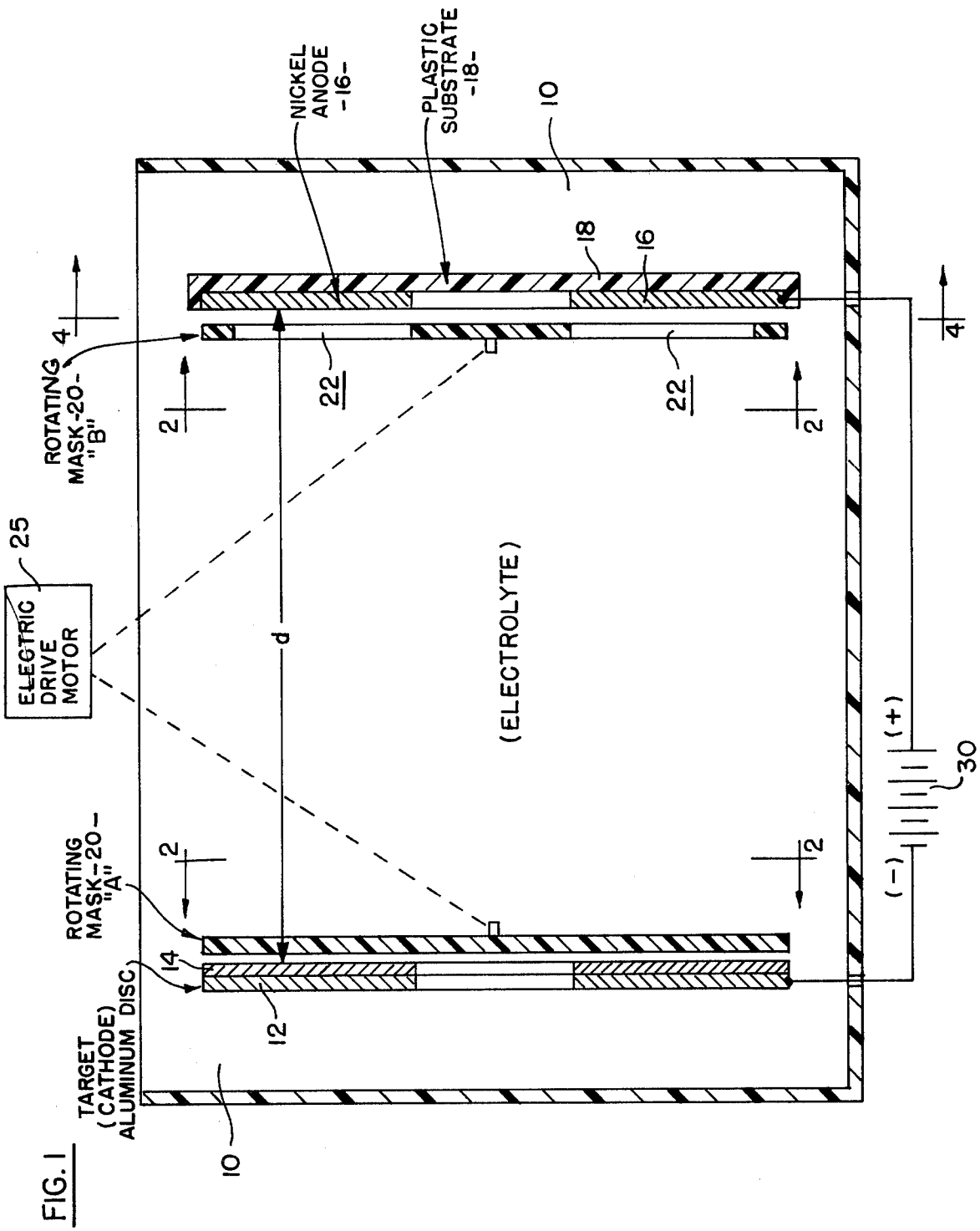

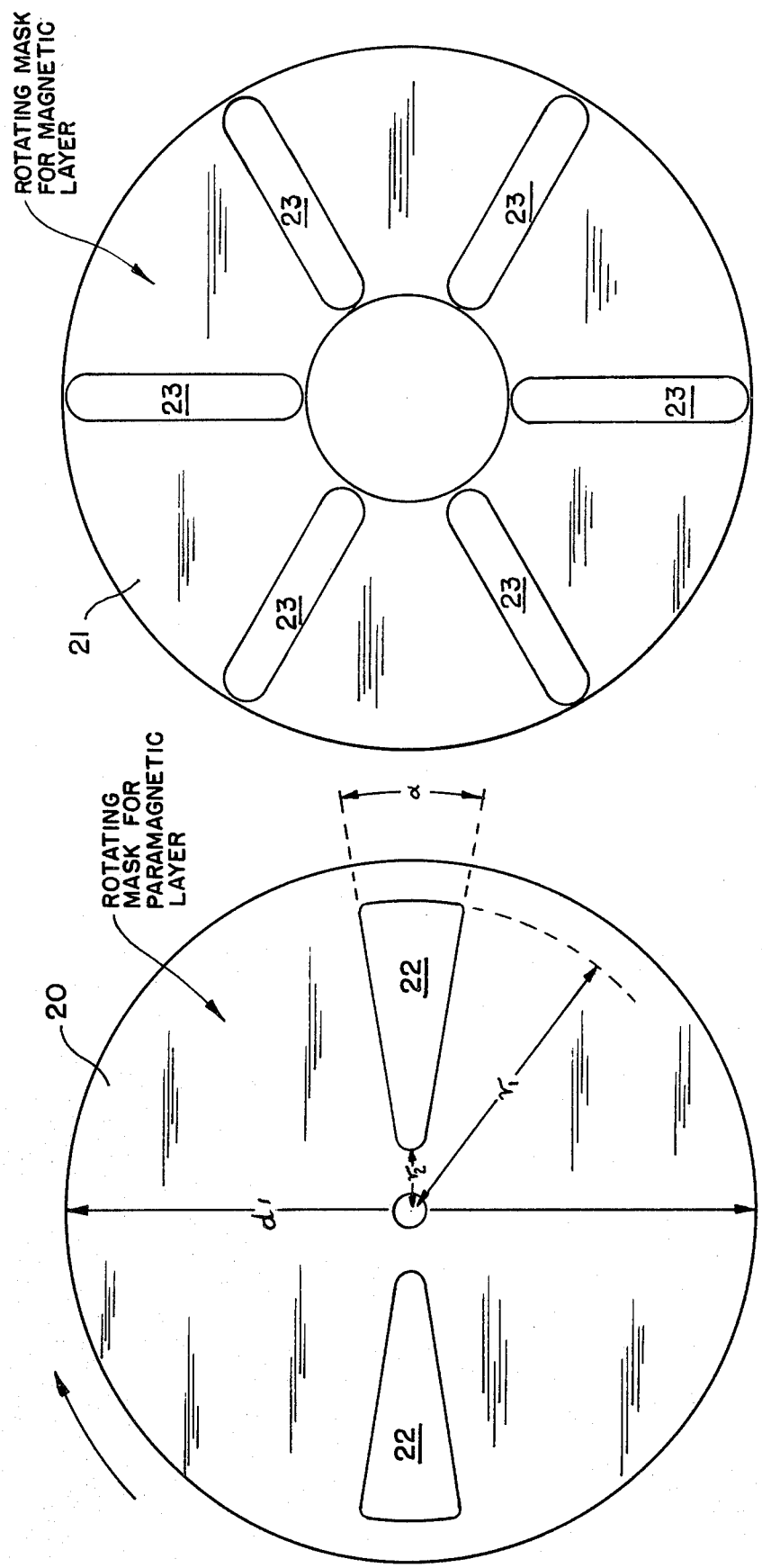

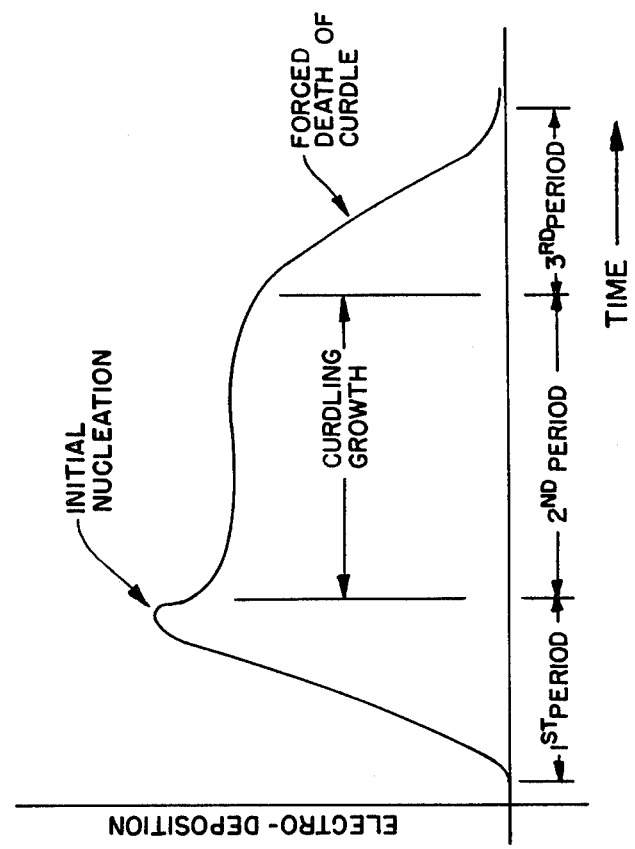
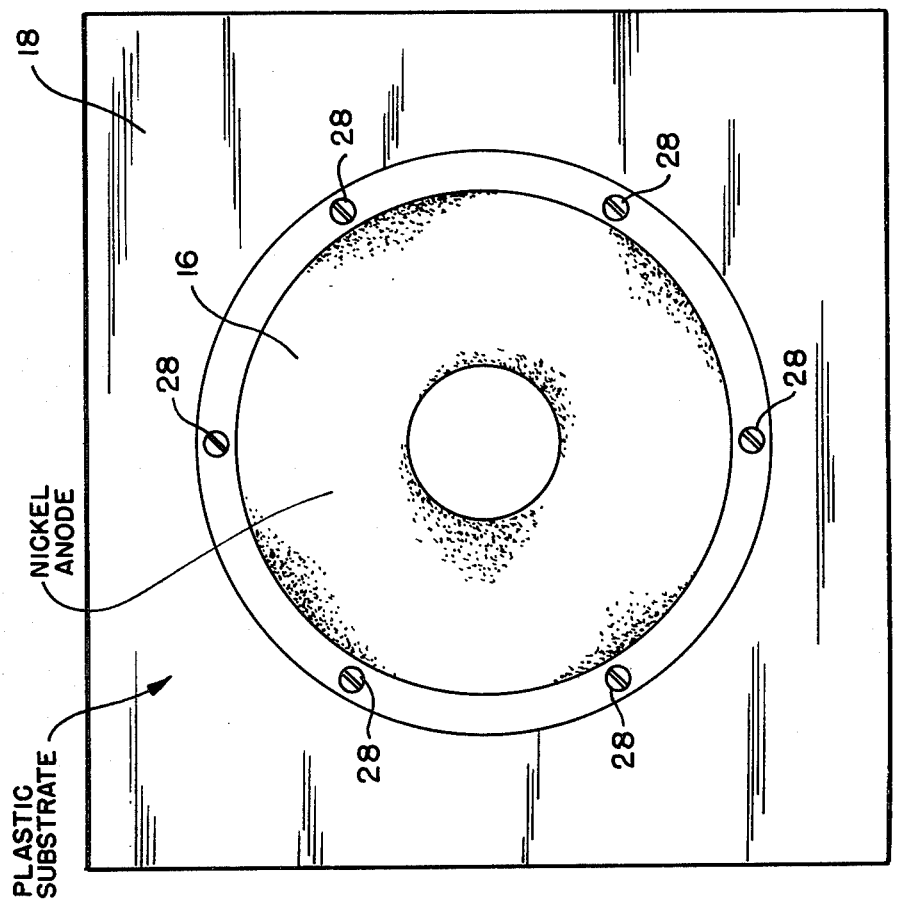

METHOD AND APPARATUS FOR PRODUCING ELECTROPLATED MAGNETIC MEMORY DISK, AND THE LIKE

BACKGROUND OF THE INVENTION

In present-day data processing systems, it is the usual practice to employ magnetic memory disks for storing binary bits representing digital data. The memory disks usually comprise a magnetic disc which is scanned by a magnetic transducer head. The magnetic head is capable of inducing flux reversals in the magnetic domains of the disk and, in turn, of reading a pattern of magnetic orientations on the disk, and translating changes in the magnetic orientation into a series of digitally encoded binary bits.

Several types of magnetic head/magnetic memory disk interfaces are used in present-day data processing systems. For example, magnetic tape memories and floppy magnetic disk memories include magnetic heads which are in intimate contact with the magnetic memory. Another type of magnetic memory is known as the Winchester type which uses rigid magnetic disks. The Winchester magnetic disk memory provides maximum reliability and minimum error generation by eliminating physical contact between the magnetic head and the magnetic disk. This is achieved by means of a flying magnetic head which does not actually contact the surface of the magnetic disk.

It is evident that for maximum efficiency it is essential that the actual displacement of the head from the surface of the magnetic disk be kept at a minimum. Present-day systems are available in which the displacement is of the order of 10–14 microns. Accordingly, for satisfactory operation of the Winchester system it is essential that the surface of the magnetic disk be extremely flat and uniform.

The magnetic disk for the Winchester system is currently prepared from a slurry of gamma ferric oxide mixed in a matrix of an organic material capable of forming a thin uniform magnetic film. A rigid disk was used and the magnetic film deposited on the disk was burnished to provide the uniform surface characteristics required in that type of drive.

U.S. Pat. No. 3,634,047 discloses a method and apparatus for electroplating the magnetic film on the disk substrate so as to provide a magnetic memory disc suitable for use in the Winchester system. However, prior to the electroplating of the main magnetic film, the practice is to provide a fine grain paramagnetic film. This is usually achieved by electroless deposition techniques of a film of paramagnetic nickel/phosphorous material. However, prior to the electroplating of the main film, it is necessary for the paramagnetic nickel/phosphorous film in accordance with the prior art techniques to be burnished and polished so as to remove some of the nodules that result from the electroless deposition process.

U.S. Pat. No. 3,634,209 describes a process for producing magnetic memory devices in which the nickel/phosphorous fine grain paramagnetic film is deposited on the substrate by electroplating means, and in which the main magnetic film is then electroplated over the paramagnetic film. However, again, in order to achieve the uniform density required for the Winchester-type of system, the paramagnetic nickel/phosphorous film must be polished and burnished prior to electroplating the main magnetic film.

The requirement for burnishing and polishing in the prior art methods is primarily due to the difficulty of maintaining constant current densities over the entire plating surfaces of the disk during electroplating. In particular, since the thickness of an electrodeposit at any point on a plateable surface is proportional to the time integral of the current at that point, and since the magnetic properties of a deposit varies somewhat with the current density developed during electroplating, the lack of close control over current density in conventional electroplating apparatus has made it very difficult to plate magnetic surfaces capable of high density recording.

Accordingly, the prior art approach to provide a magnetic memory disk capable of high density recording and suitable for use in a Winchester system usually involves the following steps:

(1) An aluminum substrate is prepared by stamping a plate into the proper pre-defined dimensions. Standards have been defined by the American Society for testing materials for disks of fourteen inch, eight inch, five and one-quarter inch and 3.1 inch outer diameters.

(2) The substrates are then machined and stress relieved to obtain the finest tolerances possible.

(3) The substrates are then diamond turned and/or polished to an extremely fine finish.

(4) The polished substrates are then subjected to a series of plating operations to place a thin film of fine grain paramagnetic nickel/phosphorous material over the surface of the substrate. This film may be of the order of 0.0002 inches thick. The film may be deposited on the polished substrates either by electroless deposition techniques, or by electroplating as described in the Wolf patent.

(5) The coated substrates are then polished again in an effort to remove some of the nodules that result from the deposition process.

(6) After the polishing operation, the disks are re-racked and subjected to an electroplating operation, for example, such as described in the Faulkner patent, so that the main magnetic film may be deposited over the paramagnetic film with the required overall degree of uniformity.

(7) A protective barrier coating may then be formed over the surfaces of the plated disk.

The prior art methods, as described above, are relatively expensive, especially in the requirements of the polishing and burnishing operations. These operations are usually performed manually, and are the leading causes for product failure.

Additional problems occur when the paramagnetic nickel/phosphorous film is deposited by electroless methods due to slight variations in the characteristics of the film over the surface of the disk. These variations result in major changes in the signal response during read/write operations.

An important objective of the present invention is to provide a method and process by which the paramagnetic nickel/phosphorous film may be deposited on the substrate by electroplating techniques, so as to obviate the problems encountered when electroless deposition is used, and by which the paramagnetic film is provided with a high degree of uniformity so as to eliminate any need for the time consuming and expensive manual polishing and burnishing operations.

A detailed description may be found in the prior art with regard to the inducement of the growth of grains in an electroplated metal film and the nucleation on the film surface. Once a stable nucleus is established, the surrounding atomic steps (actually lattice grains) are energetically favored sites of high binding energy for further atoms to deposit. Growth can thus occur at levels well below the absolute barrier energy of the surface until the layer is complete. Since an abundance of surface flaws exists, providing the necessary critical energies for lattice formation, the initiation of growth on the surface by electrochemical reaction can proceed without undue duress. This activity is demonstrated in any electroplating operation.

The growth of the metallic electroplated film is fractal with random curdling in a plane grid. Each cascade stage replaces a curd with a certain number of subcurds. Not only are the positions of the subcurds random, but their numbers and their resulting distributions involve classic birth and death processes. At each stage, each curd edge can be viewed as having acquired a random offspring made of the subcurd edges. The classical results on birth and death processes show that the number $N(m)$ of the offspring subcurds present after the m'th generation are determined by the following alternative:

When $<N_1> \leq 1$, that is $D \leq 2$, it is almost certain that the offspring will eventually die out, meaning that the edge will eventually become empty, and hence of zero dimension. On the other hand when $<N_1> > 1$, that is, $D > 2$, then the offspring subcurd will have a less than one probability of dying off and a non-zero probability of expanding in numbers forever. D represents a similarity dimension in describing factal interactions.

Accordingly, the following asymptotic relationship holds true:

$$\lim_{\mu \to \infty} \text{Log } N_1(m) \log\left(\frac{1}{r^m}\right) = \text{Log}(N_1)/\log\left(\frac{1}{r}\right) = D - 2$$

The foregoing relationship suggests a generalized similarity dimension D-2.

The two-dimensional eddy traces obey an obvious modification of the same analysis, after replacing $N_1$ by a random $N_2$ such that $<N_2> = Nr$. When $(N_2) \leq 1$, that is, $D \leq 1$, each eddy face will eventually become empty. When $(N_2) > 1$, that is $D > 1$, it can be demonstrated that:

$$\lim_{\mu \to \infty} \text{Log } N_2(m)/\log\left(\frac{1}{r^m}\right) = \text{Log}(N_2)/\text{Log}\left(\frac{1}{r}\right) = D - 1$$

Hence the actual action of lattice growth in the electrodeposited paramagnetic nickel/phosphorous film is a competitive rate between a non-zero random curd fractal and the lattice deposition equilibrium of the structure. By observation, the competitive reaction results in an irregular film. Therefore, the biasing of the curdling in favor of the lattice energy results in a truly uniform paramagnetic film.

The paramagnetic film is composed of fine grain magnetic material and it consists of 92-88% nickel and 8-12% phosphorous. To achieve a truly uniform paramagnetic nickel/phosphorous film by electroplating, the electroplating process must be controlled so as to provide nucleation energy for electro-deposition on the flawed lattice areas, and by then providing for a non-zero curdling growth for a predetermined period, followed by a forced curdling death, leaving enough randomly oriented nucleation sites for the next growth cycle. In the practice of the present invention, the foregoing is achieved by providing an apertured rotating mask in the electroplating apparatus between the anode and the target electrode so that the periodicity of the uniform current flow in the electrolyte is maintained. The rate of deposition is a function of the cycling period of the mask, and the average grain size and distribution of the grain size can be readily controlled.

The use of the apertured mask obviates any need for burnishing or polishing operations and reduces the entire manufacturing process from several hours to about 20 minutes. The aperture in the rotating mask insofar as the paramagnetic layer is concerned is oriented to follow the radius line of the target electrode, and it provides a uniform current density across the surface of the target electrode as it rotates because each increment of the surface area sees the same current. A second apertured mask may be used for electroplating the magnetic layer over the paramagnetic layer in which the aperture has parallel sides so as to cause the magnetic layer to be slightly thicker towards the center of the disk for uniform magnetic response over the entire disk surface. Also, as will be described, two masks may be used and multiple apertures for improved results.

BRIEF DESCRIPTION OF THE DRAWINGS

FIG. 1 is a sectional schematic representation of electrolytic apparatus constructed in accordance with the concepts of the present invention in one of its embodiments;

FIG. 2 is a front view of a rotating apertured mask included in the apparatus of FIG. 1 for depositing the paramagnetic layer, taken along the lines 2—2 of FIG. 1;

FIG. 3 is a front view of a rotating apertured mask used for depositing the magnetic layer;

FIG. 4 is a front view of the target electrode of the apparatus of FIG. 1 taken along the line 3—3 of FIG. 1; and FIG. 5 is a curve useful in explaining the operation of the apparatus of the invention.

DETAILED DESCRIPTION OF THE ILLUSTRATED EMBODIMENT

The apparatus of FIG. 1 includes a container 10 for an appropriate electrolyte for carrying out the electro-deposition process. The container may be composed of polypropylene or any other appropriate non-corrosive material.

A target electrode 12 is mounted in the container 10, and it may take the form, for example, of an aluminum disk which is intended to form a magnetic disk memory.

The disk 12 may be formed as an aluminum substrate prepared by stamping a plate into proper pre-defined dimensions, and which is then machined and stress relieved to obtain a smooth surface. The substrate is then diamond turned and polished to an extremely fine finish. A layer 14 of zinc oxide is formed on the disk to assist in the plating process.

An anode 16 is also mounted in the container 10, and is held in place by an appropriate substrate 18. The anode is formed, for example, of nickel, of the order of 99.99% purity. The substrate 18, line container 10, may be formed of polypropylene, or other appropriate plastic.

In accordance with the invention, one or more masks 20 are rotatably mounted in container 10 between the anode 16 and the target electrode 12 in the illustrated embodiment. Two such masks designated "A" and "B" are shown, one displaced 200 mils from the target and the other displaced 200 mils from the anode. Each mask 20 has a pair of apertures 22, (FIG. 2) each with a radial length corresponding to the radius of the area of target 12 to be electroplated with the paramagnetic nickel/phosphorous layer, and each with radially extending sides. The masks "A" and "B" are rotated in unison by an electric drive motor 25 with their apertures aligned.

In a constructed embodiment, the target electrode 12 was placed in the container 10 in spaced and facing relationship with the anode 16, and spaced from the anode by a distance $d = \frac{1}{2}'' - 1\frac{1}{2}''$. The masks 20 may be formed, for example, of polypropylene, Delrin, or an epoxy glass, or any other appropriate material.

As shown in FIG. 2, each mask 20 may have a disk shape, and may, for example, have a diameter $d_1$ equal to 11". Each aperture 22 may have the shape shown in FIG. 2, and may have the following placement and dimensions:

$r_1 = 2.550$ inches
$r_2 = 0.750$ inches
$\alpha = 22°$

In order to deposit the magnetic layer of the paramagnetic layer, masks 20 of FIG. 1 are replaced by masks 21 of FIG. 3. Masks 21 each have six apertures 23 in the illustrated embodiment which are shaped to have parallel sides, as shown, to control the thickness of the magnetic layer, as explained above. Both discs 21 are rotated in unison with their apertures 23 aligned.

The anode 16, as shown in FIG. 4, may be mounted on substrate 18 by a number of screws 28. As mentioned above, the anode may be formed of nickel of, for example, 99.99% purity.

A source 30 of direct current voltage is connected across the anode 16 and the target electrode 12 (FIG. 1).

The nickel/phosphorous layer may be electrodeposited on the target electrode 12, for example, from any appropriate known electrolyte, such as a sulfate electrolyte. The following table sets forth the composition of a nickel/sulfate chloride electrolyte by which the nickel/phosphorous layer may be deposited on the surface of the target electrode.

| | |
|---|---|
| NiSO$_4$6H$_2$O | 70 g./l. |
| NaBO$_3$ | 15 g./l. |
| NaH$_2$PO$_2$H$_2$O | 3 g./l. |
| Saccharin | 8 g./l. |
| Sodium Formate (Na COOH) | 10 g./l. |

Plating may be carried out at current densities of 25-200 milliamps/square inch.

In the practice of the process, optimum results can be obtained when the resistivity of the electrolyte is of the order of 25 ohms per cc. The resistivity can be established to a desired value by adding propylene glycol to the electrolyte The curve of FIG. 5 illustrates the manner in which the paramagnetic film is deposited on the target electrode by the apparatus so as to achieve a truly uniform film. This is achieved by the rotating mask in the apparatus of the invention which provides nucleation energy for electrodeposition on the flawed lattice areas, as shown by the curve of FIG. 4 (first period); and by then providing for a non-zero curdling growth for a predetermined period (second period), followed by a forced curdling death (third period), leaving enough randomly oriented nucleation sites for the next growth.

It will be appreciated that while a particular embodiment of the invention has been shown and described, modifications may be made. It is intended in the claims to cover all modifications which come within the true spirit and scope of the invention.

What is claimed is:

1. Apparatus for depositing a layer of magnetic material on a substrate, including: a container for an electrolyte; a target mounted in said container comprising a member having an electrically conductive surface on which the layer of magnetic material is to be deposited; an anode mounted in said container in spaced and parallel relationship with said target; means for introducing a direct current voltage across said anode and target; at least one apertured mask rotatably mounted in said container between said anode and said target to provide a controlled current density across the surface of the target as the mask rotates; and means mechanically coupled to the mask for rotatably driving the mask.

2. The apparatus defined in claim 1, in which the apertured mask has a plurality of like apertures therein.

3. The apparatus defined in claim 1, and which includes two of said rotatable apertured masks mechanically coupled to the driving means and respectively positioned adjacent the anode and the target to be driven in unison by the driving means with their apertures aligned.

4. The apparatus defined in claim 1, in which said target comprises an aluminum disk substrate for a magnetic memory.

5. The apparatus defined in claim 1, in which the aperture in the mask is shaped with radially extending sides, and oriented on a radial line on the mask.

6. The apparatus defined in claim 1, in which the aperture in the mask is shaped with parallel sides, and oriented on a radial line on the mask.

7. The apparatus defined in claim 1, in which said anode is formed of nickel having a high degree of purity.

8. A process for electrodepositing a layer of material on a substrate which comprises the following steps: providing a substrate having an electrically conductive surface; immersing the substrate in an electrolyte; passing an electric current through the electrolyte from a source of the material to be deposited on the conductive surface of the substrate; and providing a rotating apertured mask in the electrolyte between the source and the substrate to produce a controlled current density across the conductive surface of the substrate.

9. The process defined in claim 8, in which the material deposited on the conductive surface of the substrate is a magnetic material.

10. The process defined in claim 8, in which the source comprises high purity nickel.

11. Apparatus for depositing a layer of magnetic material on a substrate including: a container for an electrolyte; a target mounted in said container comprising a member having an electrically conductive surface on which the layer of magnetic material is to be deposited; an anode mounted in said container in spaced relationship with said target; means for introducing a direct current voltage across said anode and target; and control means for providing a controlled current density across the surface of the target, said control means including at least one apertured mask mounted in said container between said anode and said target, and means for providing relative rotational motion between the mask and the target.

* * * * *